US012621845B2

(12) United States Patent
Li

(10) Patent No.: US 12,621,845 B2
(45) Date of Patent: May 5, 2026

(54) PDCCH BLIND DETECTION LIMITING METHOD, TERMINAL, AND NETWORK SIDE DEVICE

(71) Applicant: VIVO MOBILE COMMUNICATION CO., LTD., Dongguan (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 350 days.

(21) Appl. No.: 18/344,151

(22) Filed: Jun. 29, 2023

(65) Prior Publication Data

US 2023/0379938 A1     Nov. 23, 2023

Related U.S. Application Data

(63) Continuation of application No. PCT/CN2021/142059, filed on Dec. 28, 2021.

(30) Foreign Application Priority Data

Dec. 31, 2020     (CN) .......................... 202011629326.2

(51) Int. Cl.
*H04W 72/23*          (2023.01)
*H04W 72/0446*     (2023.01)
*H04W 72/232*       (2023.01)

(52) U.S. Cl.
CPC ..... *H04W 72/232* (2023.01); *H04W 72/0446* (2013.01)

(58) Field of Classification Search
CPC ........... H04W 72/232; H04W 72/0446; H04W 72/04; H04W 72/23; H04W 72/044; H04L 5/0094; H04L 5/0046; H04L 5/009; H04L 5/004
See application file for complete search history.

(56) References Cited

U.S. PATENT DOCUMENTS

| 2014/0029490 A1 | 1/2014 | Kim et al. | |
| 2019/0357238 A1* | 11/2019 | Zhou | H04W 72/23 |
| 2020/0351921 A1* | 11/2020 | Xu | H04L 1/1887 |
| 2021/0227563 A1 | 7/2021 | Xu et al. | |
| 2021/0392625 A1* | 12/2021 | Lin | H04W 72/23 |

FOREIGN PATENT DOCUMENTS

| CN | 110740479 A | 1/2020 |

OTHER PUBLICATIONS

Huawei. "RI-2005115 Summary #3 of email discussion [101-e-NR-Llenh-URLLC-1-33 PDCCH enhancements-02] on remaining issues on scaling PDCCH monitoring capability," 3GPP TSG RAN WG1 Meeting #101-e, vol. No. 10, Jun. 2020 (Jun. 10, 2020).

* cited by examiner

*Primary Examiner* — Wei Zhao
(74) *Attorney, Agent, or Firm* — The Webb Law Firm

(57) ABSTRACT

This application relates to the field of communication technologies. Disclosed are a PDCCH blind detection limiting method, a terminal, and a network side device. The method includes: grouping a plurality of scheduling cells, where the plurality of scheduling cells include at least one first cell that supports slot group-based physical downlink control channel PDCCH blind detection limitation; and determining, based on a grouping result, PDCCH blind detection limitation information corresponding to each group.

19 Claims, 6 Drawing Sheets

Network side device

Terminal

Terminal

Start

Group a plurality of scheduling cells    210

Determine, based on a grouping result, PDCCH blind detection limitation information corresponding to each group    220

End

PDCCH BLIND DETECTION LIMITING METHOD, TERMINAL, AND NETWORK SIDE DEVICE

CROSS-REFERENCE TO RELATED APPLICATIONS

This application is a continuation of International Application No. PCT/CN2021/142059, filed on Dec. 28, 2021, which claims priority to Chinese Patent Application No. 202011629326.2 filed on Dec. 31, 2020, which are incorporated herein by reference in their entireties.

TECHNICAL FIELD

This application relates to the field of communication technologies, and in particular, to a PDCCH blind detection limiting method, a terminal, and a network side device.

BACKGROUND

When new radio (NR) runs in a high frequency band (for example, higher than 52.6 GHz), granularities of a symbol and a slot are decreased due to an increase in a subcarrier spacing (SCS). If a monitoring capability of a physical downlink control channel (PDCCH) is defined still based on a granularity per slot (per slot) or per span (per span, where one span includes a plurality of symbols), complexity of implementation by a terminal (User Equipment, UE) is greatly increased.

In view of this, how to provide a method to reduce complexity of implementing PDCCH monitoring by the UE is of great significance.

SUMMARY

Embodiments of this application is to provide a PDCCH blind detection limiting method, a terminal, and a network side device.

According to a first aspect of the present disclosure, a PDCCH blind detection limiting method is provided, applied to a terminal, which includes:

grouping a plurality of scheduling cells, where the plurality of scheduling cells include at least one first cell that supports slot group-based physical downlink control channel PDCCH blind detection limitation; and determining, based on a grouping result, PDCCH blind detection limitation information corresponding to each group.

According to a second aspect of the present disclosure, a PDCCH blind detection limiting method is provided, applied to a network side device, which includes:

sending a PDCCH based on physical downlink control channel PDCCH blind detection limitation, where the PDCCH blind detection limitation is determined in the following manner:

grouping a plurality of scheduling cells, and determining, based on a grouping result, PDCCH blind detection limitation information corresponding to each group, where the plurality of scheduling cells include at least one first cell that supports slot group-based PDCCH blind detection limitation.

According to a third aspect of the present disclosure, a PDCCH blind detection limiting apparatus is provided, applied to a terminal, which includes:

a grouping module, configured to group a plurality of scheduling cells, where the plurality of scheduling cells include at least one first cell that supports slot group-based physical downlink control channel PDCCH blind detection limitation; and a determining module, configured to determine, based on a grouping result, PDCCH blind detection limitation information corresponding to each group.

According to a fourth aspect of the present disclosure, a PDCCH blind detection limiting apparatus is provided, applied to a network side device, which includes:

a channel sending module, configured to send a PDCCH based on physical downlink control channel PDCCH blind detection limitation, where the PDCCH blind detection limitation is determined in the following manner:

grouping a plurality of scheduling cells, and determining, based on a grouping result, PDCCH blind detection limitation information corresponding to each group, where the plurality of scheduling cells include at least one first cell that supports slot group-based PDCCH blind detection limitation.

According to a fifth aspect of the present disclosure, a terminal is provided, which includes a processor, a memory, and a program or instructions stored in the memory and executable on the processor, the program or instructions, when executed by the processor, implementing the steps of the method according to the first aspect.

According to a sixth aspect of the present disclosure, a network side device is provided, which includes a processor, a memory, and a program or instructions stored in the memory and executable on the processor, the program or instructions, when executed by the processor, implementing the steps of the method according to the second aspect.

According to a seventh aspect of the present disclosure, a readable storage medium is provided, the readable storage medium storing a program or instructions, the program or instructions, when executed by the processor, implementing the step of the method according to the first aspect, or the step of the method according to the second aspect.

According to an eighth aspect of the present disclosure, a chip is provided, including a processor and a communication interface, the communication interface being coupled to the processor, and the processor being configured to run a program or instructions of a network side device to implement the method according to the first aspect or the method according to the second aspect.

According to a ninth aspect of the present disclosure, a computer program product is provided, the computer program product being stored in a non-volatile storage medium, and the computer program product being executed by at least one processor to implement the method according to the first aspect or the method according to the second aspect.

According to a tenth aspect of the present disclosure, an embodiment of this application provides a communication device, the communication device being configured to perform the steps of the method according to the first aspect or the steps of the method according to the second aspect.

3

Figure 4:
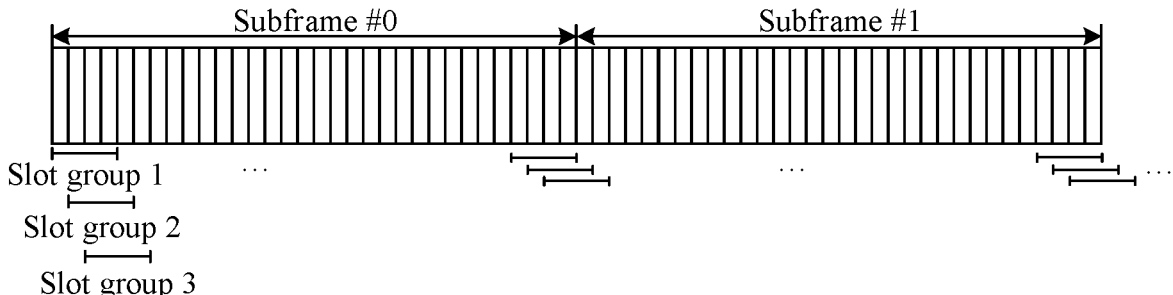
Figure 5:
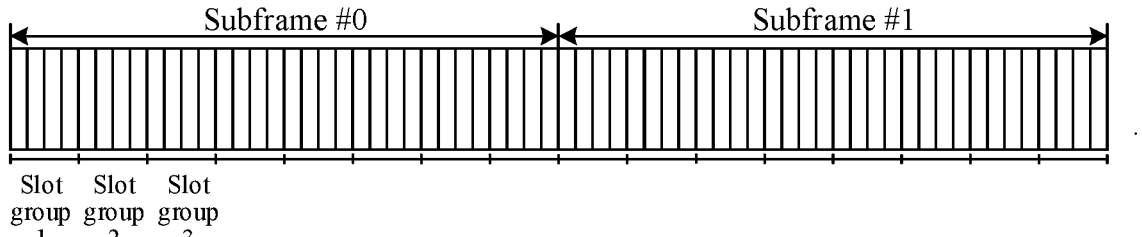
Figure 6:
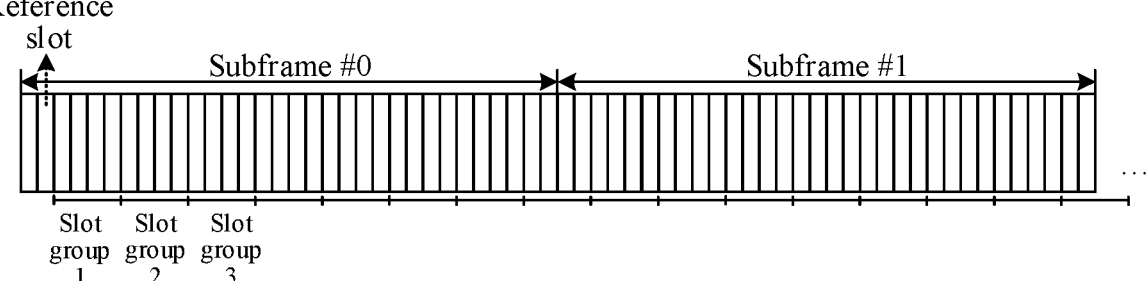
Figure 7:
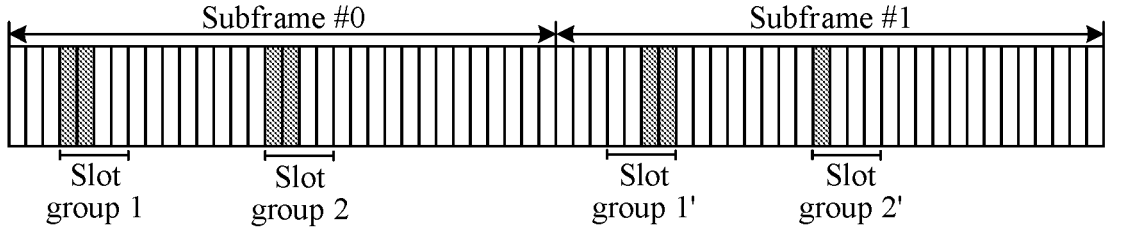
Figure 8:
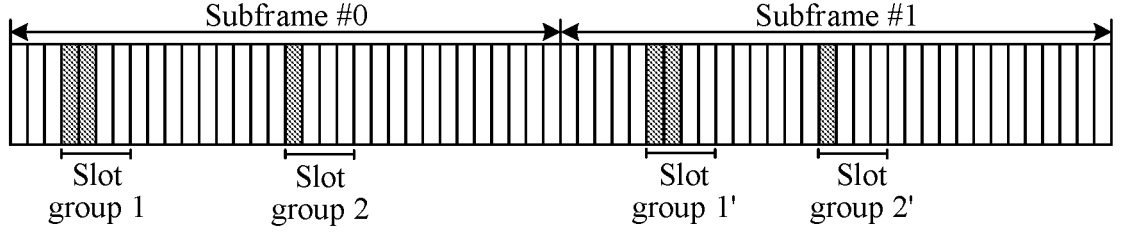
Figures 9, 10, 11:
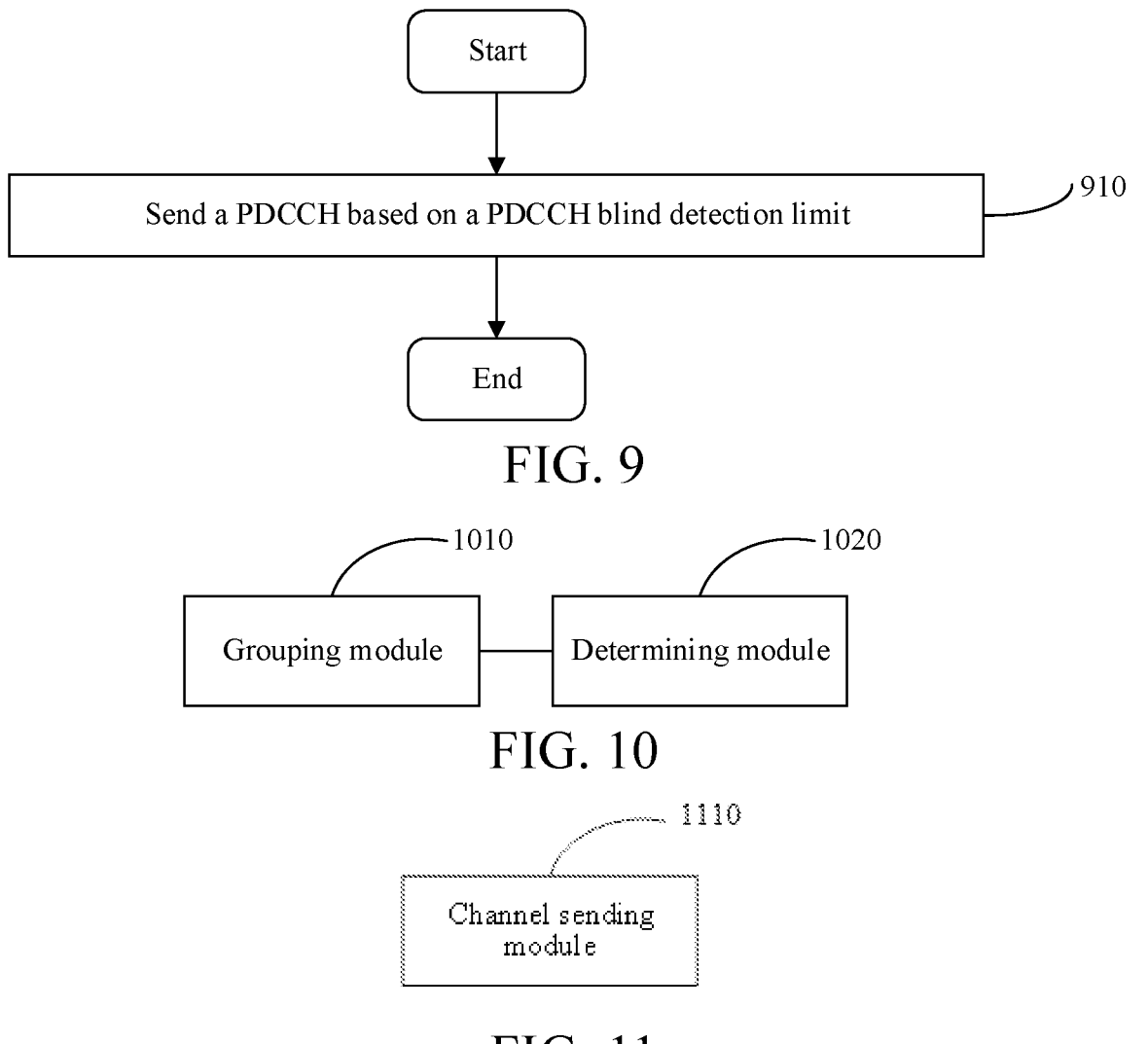
Figure 12:
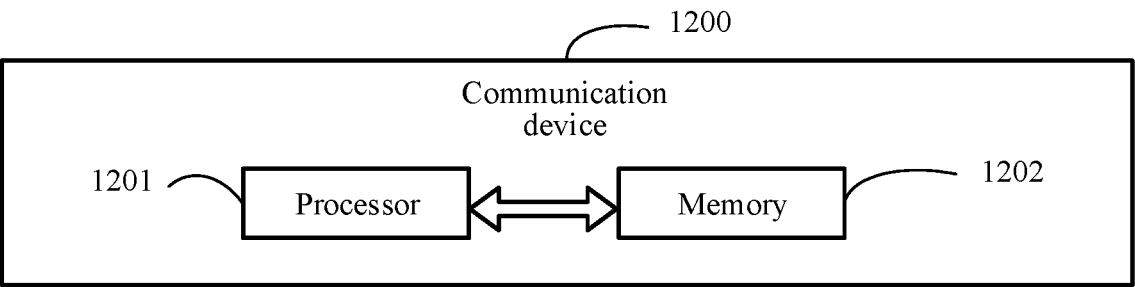
Figure 13:
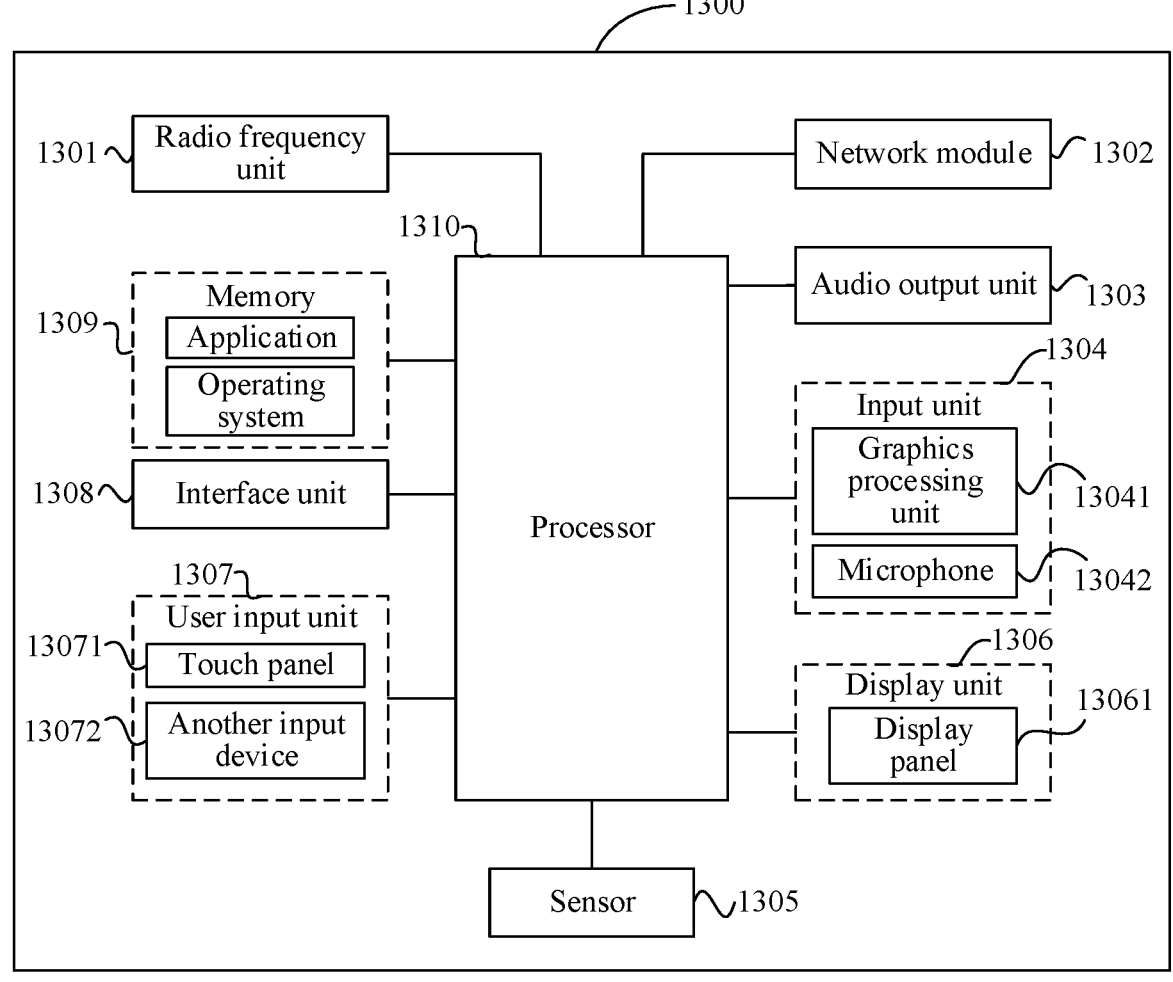
Figure 14:
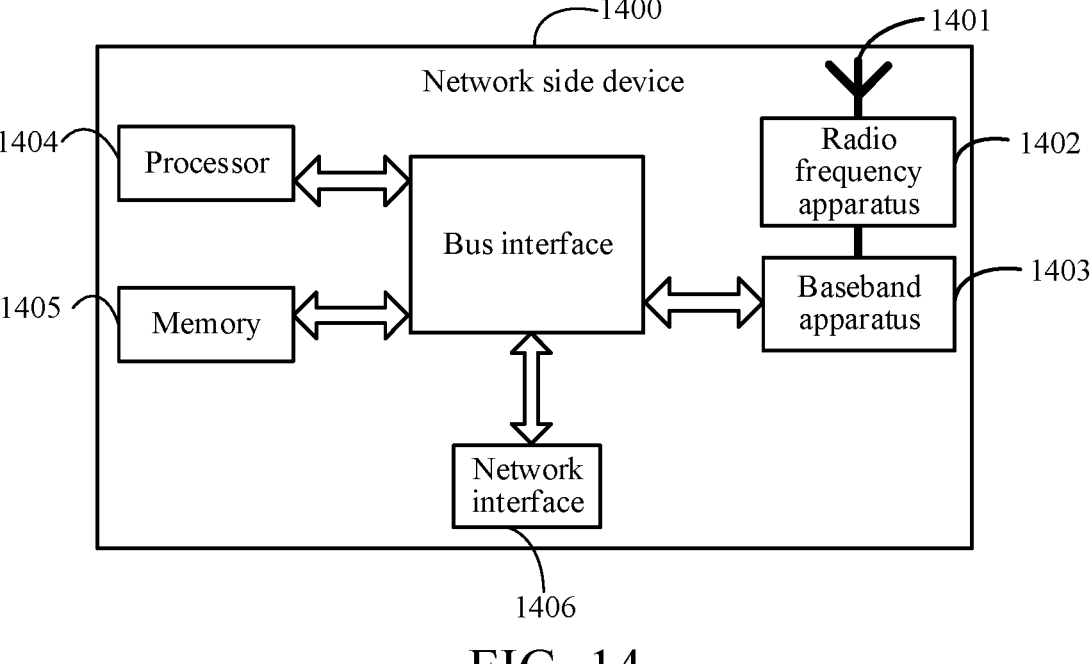

FIG. 4 is a schematic diagram 1 of a location of a slot group according to an embodiment of this application;

FIG. 5 is a schematic diagram 2 of a location of a slot group according to an embodiment of this application;

FIG. 6 is a schematic diagram 3 of a location of a slot group according to an embodiment of this application;

FIG. 7 is a schematic diagram 1 of a pattern of a slot group according to an embodiment of this application;

FIG. 8 is a schematic diagram 2 of a pattern of a slot group according to an embodiment of this application;

FIG. 9 is a schematic flowchart 2 of a PDCCH blind detection limiting method according to an embodiment of this application;

FIG. 10 is a schematic diagram 1 of a structure of a PDCCH blind detection limiting apparatus according to an embodiment of this application;

FIG. 11 is a schematic diagram 2 of a structure of a PDCCH blind detection limiting apparatus according to an embodiment of this application;

FIG. 12 is a schematic diagram of a structure of a communication device implementing an embodiment of this application;

FIG. 13 is a schematic diagram of a hardware structure of a terminal implementing an embodiment of this application; and FIG. 14 is a schematic diagram of a hardware structure of a network side device implementing an embodiment of this application.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person skilled in the art based on the embodiments of this application without creative efforts shall fall within the protection scope of this application.

In the specification and the claims of this application, the terms "first", "second", and so on are intended to distinguish similar objects but do not necessarily indicate a specific order or sequence. It is to be understood that the term used in such a way is interchangeable in proper circumstances, so that the embodiments of this application can be implemented in other sequences than the sequence illustrated or described herein. In addition, the objects distinguished by "first", "second", and the like are usually of one type, and a quantity of objects is not limited, for example, there may be one or more first objects. In addition, "and/or" used in the specification and the claims represents at least one of the connected objects, and a character "/" in this specification generally indicates an "or" relationship between the associated objects.

It is to be noted that, the technologies described in the embodiments of this application are not limited to a long term evolution (LTE)/LTE-Advanced (LTE-A) system, or may be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. In the embodiments of this application, the terms "system" and "network" are usually interchangeably used, and the technology described herein can be applied to the systems and radio technologies mentioned above, and can also be applied to other systems and radio technologies. However, although the technologies are also applicable to applications other than NR system applications, for example, a 6th generation (6G) communication system, a new radio (NR) system is exemplarily described in the following descriptions, and the term "NR" is used in most of the following descriptions.

Figures 1, 2:
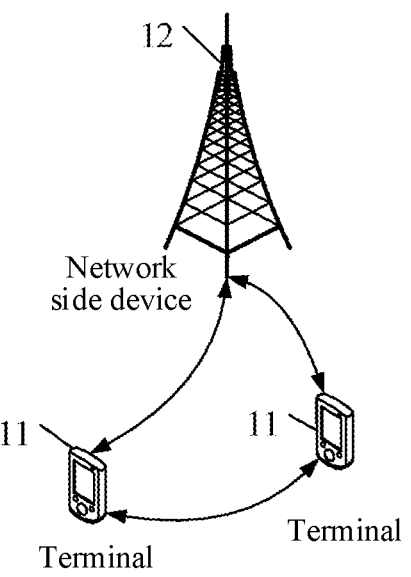
FIG. 1 is a block diagram of a wireless communication system according to an embodiment of this application.
FIG. 2 is a schematic flowchart 1 of a PDCCH blind detection limiting method according to an embodiment of this application.
Figures 3A, 3B, 3C, 3D, 3E:
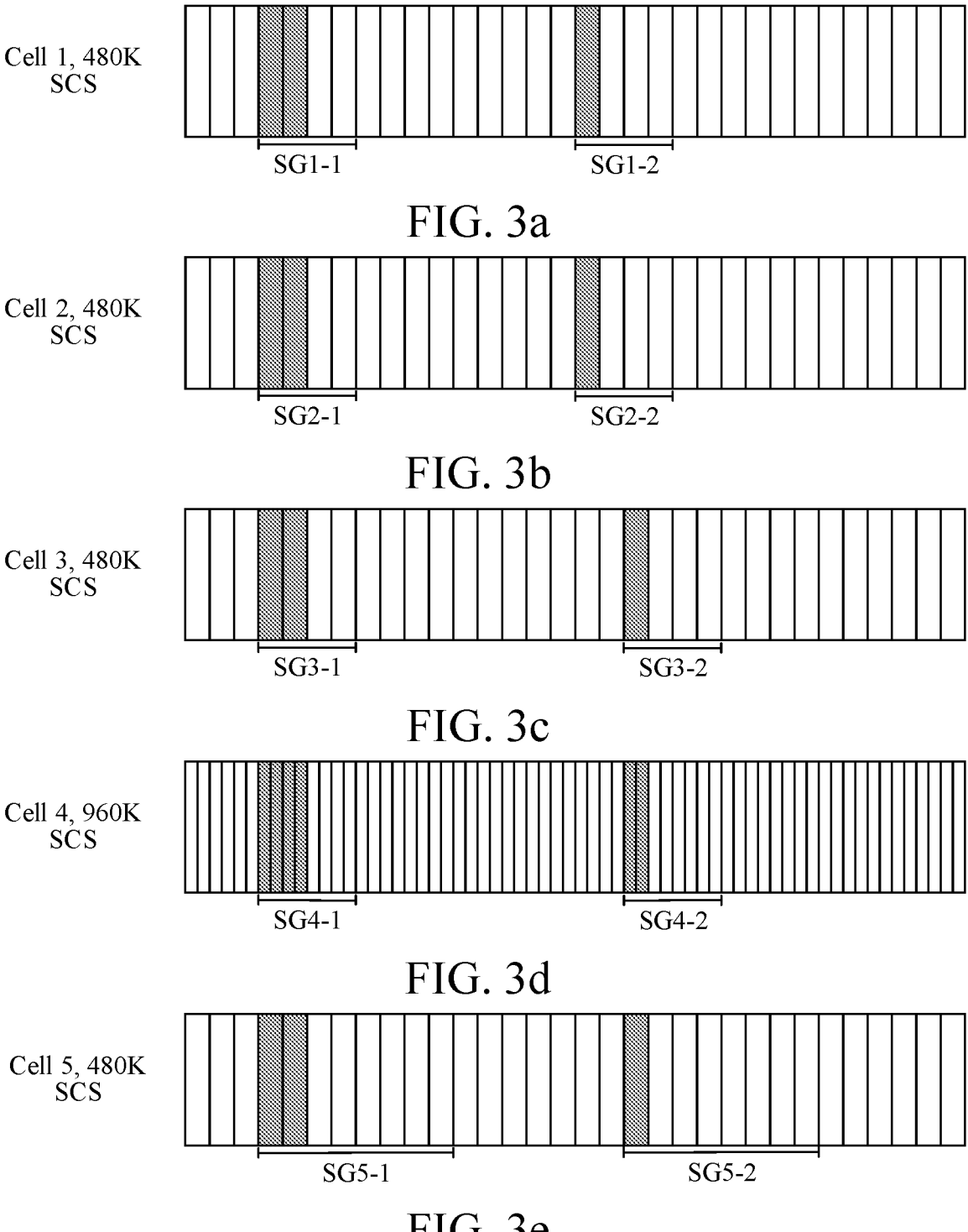
FIG. 3a to FIG. 3e are schematic diagrams of scheduling an SCS and a slot group pattern of a cell according to an embodiment of this application.

FIG. 1 shows a block diagram of a wireless communication system to which an embodiment of this application is applicable. The communication system includes a terminal 11 and a network side device 12. However, the terminal 11 may also be referred to as a terminal device or a user equipment (UE). The terminal 11 may be a terminal side device such as a mobile phone, a tablet personal computer, a laptop computer or notebook computer, a Personal Digital Assistant (PDA), a palmtop computer, a notebook, an ultra-mobile personal computer (UMPC), a Mobile Internet Device (MID), a wearable device, a vehicle user equipment (VUE), a pedestrian user equipment (PUE), or the like. The wearable device includes a bracelet, a headset, glasses, and the like. It is to be noted that, the specific type of the terminal 11 is not limited in this embodiment of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a B node, an evolved B node (eNB), a home B node, a home evolved B node, a WLAN access point, a Wi-Fi node, a transmitting receiving point (TRP), or another suitable term in the field. The base station is not limited to a specific technical term as long as the same technical effect is achieved. It is to be noted that, in the embodiments of this application, a base station in the NR system is only used as an example, but the specific type of the base station is not limited.

To better understand the technical solutions provided in the embodiments of this application, content is described below:

BD/CCE Budget of PDCCH of NR

For a total quantity of PDCCH candidates (candidate PDCCHs) in an SS with an SS ID of Sj that corresponds to scheduling nCI, if there is a PDCCH candidate with a smaller number in the SS or in another SS with a smaller SS ID completely overlapping a control channel element (CCE) of the PDCCH candidate, having same scrambling (scrambling), and having same format and size of downlink control information (DCI), the total quantity is not counted in the PDCCH candidates monitored by the PDCCH.

For a single cell operation (single cell operation), a maximum quantity of PDCCH candidates of blind detection (BD) (per slot and per serving cell) is shown in Table 1.

TABLE 1

| $\mu$ | Maximum quantity of PDCCH candidates monitored by per slot and per serving cell $M_{PDCCH}^{max,\ slot,\ \mu}$ |
| --- | --- |
| 0 | 44 |
| 1 | 36 |
| 2 | 22 |
| 3 | 20 |

The CCE is considered to be non-overlapping when the following two conditions are met: (1) Indicators of a control-resource set (CORESET) are different. (2) First symbols (symbols) of PDCCH candidates corresponding to the CCE are different.

For a single cell operation, a maximum quantity of non-overlapping CCEs of BD (per slot and per serving cell) is shown in Table 2.

TABLE 2

| μ | Maximum quantity of non-overlapping CCEs per slot and per serving cell $C_{PDCCH}^{max,\,slot,\,\mu}$ |
|---|---|
| 0 | 56 |
| 1 | 56 |
| 2 | 48 |
| 3 | 32 |

For a multi-cell operation, a slot granularity scheduled per slot depends on an SCS of a scheduling cell.

For each scheduled cell, it is not expected that a slot determined by the SCS corresponding to a cell scheduling the scheduled cell is greater than a Cmax value and a calculated Ctotal value. Ctotal is calculated as follows:

If a total quantity of downlink cells configured by the UE is less than or equal to a certain value N_cell^cap, it is equivalent to only one PDCCH monitoring limit.

For a scheduling cell whose SCS is μ, a total quantity of PDCCH candidates per slot for each scheduled cell with μ as a reference SCS does not exceed a value in Table 1, and a quantity of non-overlapping CCEs does not exceed a value in Table 2.

If the total quantity of downlink cells configured by the UE is greater than a certain value N_cell^cap, PDCCH monitoring by the UE needs to meet two limits:

For all scheduling cells whose SCSs are μ, the UE does not expect a total quantity of PDCCH candidates and a total quantity of non-overlapping CCEs in the scheduling cells to exceed a certain limit, where the limit is determined based on a proportion of all small cells in the SCS.

For each scheduled cell, an SCS of a scheduling cell of the scheduled cell is μ, the UE does not expect a quantity of PDCCH candidates and a quantity of CCEs monitored on the scheduling cell to exceed a limit on the foregoing total quantity and a limit per cell.

The PDCCH blind detection limiting method provided in the embodiments of this application is described in detail below with reference to the accompanying drawings by using specific embodiments and application scenarios thereof.

FIG. 2 is a schematic flowchart 1 of a PDCCH blind detection limiting method according to an embodiment of this application. As shown in FIG. 2, an embodiment of this application provides a PDCCH blind detection limiting method. The method is applied to a terminal and may include:

S210: Group a plurality of scheduling cells. The plurality of scheduling cells include at least one first cell that supports slot group-based PDCCH blind detection limitation.

S220: Determine, based on a grouping result, PDCCH blind detection limitation information corresponding to each group.

It is to be noted that, an execution body of the method may be a terminal. The technical solutions of this application are described in detail below by using an example in which the terminal performs the method.

First, the UE may group the plurality of scheduling cells based on a grouping rule, and after determining a grouping result, the UE may determine, for each group, PDCCH blind detection limitation information corresponding to the group.

In scheduling cells to be grouped by the UE, a quantity of first cells may be 1, 3, 5, or the like. Alternatively, all scheduling cells may be first cells.

According to the PDCCH blind detection limiting method provided in the embodiments of this application, scheduling cells are grouped, and a blind detection corresponding to each group is determined based on a grouping result. Compared with the related art in which a PDCCH monitoring capability is mechanically defined based on a granularity per slot or per span, this application can effectively reduce complexity of implementing PDCCH monitoring by the UE, thereby significantly improving communication efficiency and reducing power consumption of the UE, which has a broad application prospect.

In an embodiment, the PDCCH blind detection limiting method provided in this embodiment of this application may further include: determining, in the following manner, a slot group to which the PDCCH blind detection limitation is applied and that is in the first cell:

determining a quantity N of slots or a slot quantity set {Ni} contained in the slot group to which the PDCCH blind detection limitation is applied. It may be understood that, each slot group corresponds to a quantity n of slots. When there are a plurality of slot groups, there may be a plurality of quantities N of slots (where N may be of different values), and the plurality of quantities N of slots N form the slot quantity set {Ni}. Elements (the quantities N of slots corresponding to different slot groups) in the slot quantity set {Ni} may be the same or different from each other.

A location of the slot group to which the PDCCH blind detection limitation is applied is determined based on the determined quantity N of slots or slot quantity set {Ni}.

Optionally, the quantity N of slots or the slot quantity set {Ni} may be obtained in one of the following manners:

Manner 1: Obtain through a network configuration.

The network may allocate a quantity of slots for each slot group based on actual needs, for example, parameters of data to be transmitted (size, frequency, and the like) and a time domain resource occupancy status, so that the quantity N of slots to be included in a slot group (when there is only one slot group) or the slot quantity set {Ni} (when there are a plurality of slot groups).

Manner 2: Obtain through a quantity of a plurality of physical downlink shared channels PDSCHs or a quantity of slots that are schedulable by a downlink control information DCI time domain scheduling parameter.

The network may determine the quantity N of slots based on the quantity of the plurality of PDSCHs or the quantity of slots that can be scheduled by the DCI time domain scheduling parameter. The quantity N of slots may be in a one-to-one correspondence with the quantity of the plurality of PDSCHs or the quantity of slots that can be scheduled, or may be in a proportion to the quantity of the plurality of PDSCHs or the quantity of slots that can be scheduled, for example, the proportion may be 2:1. For example, when the quantity of the plurality of PDSCHs or the quantity of slots that can be scheduled is 4, the quantity N of slots may be 8.

The quantity of the plurality of PDSCHs or the quantity of slots that can be scheduled may be respectively used as a quantity of slots included in different slot groups. Alternatively, a maximum value or a minimum value of the quantity of the plurality of PDSCHs or the quantity of slots that can be scheduled by the DCI time domain scheduling parameter may be used as a quantity of slots included in the slot group.

Manner 3: Obtain through a capability parameter reported by the terminal UE, where the capability parameter includes the quantity N of slots or the slot quantity set {Ni}, or includes the quantity of a plurality of PDSCHs and the quantity of slots that are schedulable by the DCI time domain scheduling parameter.

The quantity N of slots or the slot quantity set {Ni} may be determined based on the capability parameter reported by the UE to the network. The capability parameter is a parameter that is of the UE and that is related to a PDCCH monitoring capability.

The capability parameter may include the quantity N of slots or the slot quantity set {Ni}. When the quantity N of slots is more, all quantities N of slots may be respectively used as quantities of slots included in different slot groups. Alternatively, a maximum value, a minimum value, a median, or a mean value of all quantities N of slots may be used as a quantity of slots to be included in the slot group.

The capability parameter may further include the quantity of the plurality of PDSCHs or the quantity N of slots that can be scheduled by the DCI time domain scheduling parameter. A quantity of a plurality of PDSCHs or a quantity of all slots that can be scheduled by a DCI time domain scheduling parameter may be respectively used as a quantity of slots to be included in different slot groups. Alternatively, a maximum value, a minimum value, a median, or a mean value of the quantity of the plurality of PDSCHs or the quantity of slots that can be scheduled by the DCI time domain scheduling parameter may be used as a quantity of slots included in the slot group.

After receiving the capability parameter reported by the UE, the network may configure a corresponding resource for the UE based on the capability parameter, to facilitate the UE in PDCCH monitoring.

Manner 4: Obtain through a quantity N of slots or a slot quantity set {Ni} predefined in a protocol.

The UE and the network may also follow relevant provisions of the protocol, and perform PDCCH monitoring or resource allocation respectively based on the quantity N of slots or the slot quantity set {Ni} that is predefined in the protocol.

It may be understood that, in the case of no conflict, the quantity N of slots or the slot quantity set {Ni} may further be determined through a combination of the foregoing manners. For example, the quantity N of slots or the slot quantity set {Ni} may be determined in combination with a maximum value or a minimum value in Manner 2 or Manner 3.

According to the PDCCH blind detection limiting method provided in the embodiments of this application, the quantity of slots or the slot quantity set can be determined in the foregoing manners, so that feasibility of PDCCH blind detection is improved.

In an embodiment, the location of the slot group may be determined in any one of the following manners:

Manner I: Determine through any N consecutive slots.

After the quantity N of slots and the slot quantity set {Ni} of the slot group are determined, the location of the slot group may be determined based on the determined quantity N of slots.

In Manner I, the location of the slot group may be any N consecutive slots. As shown in FIG. 4, when there are 4 slots, the location of the slot group may be any consecutive 4 slots in subframes Subframe#0 and Subframe#1, as shown in Slot group 1, Slot group 2, Slot group 3, and the like in FIG. 4.

Manner II: Form, on a radio frame or radio subframe or slot bundling slot bundling, a slot group every N slots from a first slot, where in a last group, a last slot of the radio frame or radio subframe or slot bundling is an end slot, and repeating, by a pattern of a slot group, on each radio frame or radio subframe or slot bundling.

The slot bundling is a unit having a plurality of consecutive slots, and a quantity of slots included in the slot bundling is greater than or equal to a quantity of slots included in the slot group.

Manner III: Use a slot configured by a network or reported by the UE as a start slot or a reference slot, and determining the location of the slot group based on the start slot or the reference slot and the quantity N of slots.

In Manner III, the slot configured through the network or reported by the UE may be used as a start slot or a reference slot, and every N consecutive or non-consecutive slots from the start slot or the reference slot may be used as the location of the slot group.

The reference slot may also be used as a reference point, and every N consecutive or non-consecutive slots from a preset quantity before or after the reference slot may be used as the location of the slot group. For example, every 4 consecutive slots from a slot that is 2 slots separated from the reference slot, that is, from a third slot after the reference slot may be used as the location of the slot group.

As shown in FIG. 5, a first slot #0 in a subframe Subframe#0 may be used as a start slot, and every 4 consecutive slots from slot #0 form a slot group, for example, Slot group 1, Slot group 2, Slot group 3, and the like.

As shown in FIG. 6, a first slot in the subframe Subframe#0 may also be used as a reference slot (Reference slot), and every 4 consecutive slots from the reference slot form a slot group, for example, Slot group 1, Slot group 2, Slot group 3, and the like.

Manner IV: Determine the pattern of the slot group based on a monitoring occasion configured by a search space SS.

The location of the slot group may also be determined based on the monitoring occasion configured by the SS with reference to the quantity N of slots in the slot group. After the location of the slot group is determined, the pattern of the slot group on the radio frame, radio subframe or slot bundling may be determined based on a location of each slot group.

According to the PDCCH blind detection limiting method provided in the embodiments of this application, the location of the slot group is determined in the foregoing manners, which can further improve feasibility of PDCCH monitoring.

In an embodiment, the determining the pattern of the slot group based on a monitoring occasion configured by an SS may include:

repeating, by the pattern of the slot group, on each radio frame or radio subframe or slot bundling, where a start point of a first slot group is a first slot having a monitoring occasion in the radio frame or radio subframe or slot bundling, and N slots from the start point of the first slot group form the first slot group, where a start point of a next slot group is a first slot that has a monitoring occasion and that is not in any previous slot group, and N slots from the start point of the next slot group form one slot group; and sequentially performing determination on a last slot group until an end point of the radio frame or radio subframe or slot bundling.

As shown in FIG. 7, a dark part represents a monitoring occasion. Slot group 1 is a first slot group in the subframe Subframe#0, a start point of the slot group is a first slot (a fourth slot) with a monitoring occasion in the subframe Subframe#0, and 4 slots from the slot form Slot group 1. Slot group 2 is a second slot group in the subframe Subframe#0, a start point of the slot group is a first slot (a 16th slot) with a monitoring occasion that is not included in Slot group 1, and 4 slots from the slot form Slot group 2.

Since a pattern of the slot group repeats in each radio frame or radio subframe or slot bundling, a pattern of the slot group in the subframe Subframe#1 needs to be consistent with a pattern of the slot group in the subframe Subframe#0, that is, a start point of Slot group 1' is the fourth slot in the subframe Subframe#1, and 4 slots from this slot form Slot group 1'. A start point of Slot group 2' is the 16th slot in the subframe Subframe#1, and 4 slots from the slot form Slot group 2'.

In an embodiment, the determining the pattern of the slot group based on a monitoring occasion configured by an SS may include:

varying, by the pattern of the slot group, on each radio frame or radio subframe, where for each radio frame or radio subframe or slot bundling, a start point of a first slot group is a first slot having a monitoring occasion in the radio frame or radio subframe or slot bundling, and N slots from the start point of the first slot group form the first slot group; and a start point of a next slot group is a first slot that has a monitoring occasion and that is not in any previous slot group, and N slots from the start point of the next slot group form one slot group; and sequentially performing determination on a last slot group until the radio frame or radio subframe or slot bundling ends.

As shown in FIG. 8, a dark part represents a monitoring occasion. Slot group 1 is a first slot group in the subframe Subframe#0, a start point of the slot group is a first slot with a monitoring occasion in the subframe Subframe#0, and 4 slots from the slot form Slot group 1. Slot group 2 is a second slot group in the subframe Subframe#0, a start point of the slot group is a first slot with a monitoring occasion that is not included in Slot group 1, and 4 slots from the slot form Slot group 2.

Slot group 3 is a first slot group in the subframe Subframe#1, a start point of the slot group is a first slot with a monitoring occasion in the subframe Subframe#1, and 4 slots from the slot form Slot group 3. Slot group 4 is a second slot group in the subframe Subframe#1, a start point of the slot group is a first slot with a monitoring occasion that is not included in Slot group 3, and 4 slots from the slot form Slot group 4.

It can be learned from FIG. 8 that, in the subframe Subframe#0, Slot group 1 starts from the fourth slot, and Slot group 2 starts from the 16th slot. In the subframe Subframe#1, Slot group 3 starts from the sixth slot, and Slot group 4 starts from the 16th slot. Therefore, the pattern of the slot group differs between the radio subframes Subframe#0 and Subframe#1.

In an embodiment, the determining the pattern of the slot group based on a monitoring occasion configured by an SS may include:

using a slot configured by a network or reported by the UE as a start slot or a reference slot, and determining the pattern of the slot group from the start slot, or determining the pattern of the slot group from a start point slot spaced apart from the reference slot by a preset quantity of slots, where a start point of a first slot group is a first slot having a monitoring occasion after the start slot or the start point slot, and N slots from the start point of the first slot group form the first slot group; and a start point of a next slot group is a first slot that has a monitoring occasion and that is not in any previous slot group, and N slots from the start point of the next slot group form one slot group; and sequentially determining the pattern of the slot group.

It may be understood that, in this embodiment, different from the embodiment shown in FIG. 8, the start point of the first slot group depends on the network configuration or the slot reported by the UE. After the start point of the first slot group is determined, a specific manner of forming a slot group subsequently may be the same as the embodiment shown in FIG. 8. Details are not described herein again.

It is to be noted that, in this embodiment, the pattern of the slot group may be the same on each radio frame or radio subframe or slot bundling, or may be different on each radio frame or radio subframe or slot bundling. This is not specifically limited in this embodiment of this application.

In an embodiment, a rule for grouping the plurality of scheduling cells may include any one or more of the following:

Rule 1: Divide all scheduling cells that support slot group-based PDCCH blind detection limitation and have a same subcarrier spacing SCS into one group.

As shown in FIG. 3a to FIG. 3e, Rule 1 is described in detail below by using FIG. 3a to FIG. 3e as examples.

It is to be noted that, FIG. 3a to FIG. 3e show a subframe of a scheduling cell, where "SG" represents a slot group. A dark part represents a PDCCH monitoring occasion.

It can be learned from FIG. 3a to FIG. 3e, each of Cell 1, Cell 2, Cell 3, Cell 4, and Cell 5 includes two slot groups. Therefore, Cell 1, Cell 2, Cell 3, Cell 4, and Cell 5 are scheduling cells that support slot group-based PDCCH blind detection limitation.

In addition, an SCS of each of Cell 1, Cell 2, Cell 3, and Cell 5 is 480 K, but an SCS of Cell 4 is 960 K. Based on the above, after scheduling cells having a same SCS are divided into one group based on Rule 1, a grouping result is as follows:

First group: {Cell 1, Cell 2, Cell 3, Cell 5}

Second group: {Cell 4}

Rule 2: Divide all scheduling cells that support slot group-based PDCCH blind detection limitation, have a same SCS, and have a same quantity of slots in slot groups and/or have a same minimum spacing between the slot groups into one group.

Still using FIG. 3a to FIG. 3e as examples, Rule 2 is described in detail below.

If the scheduling cells with the same SCS and the same quantity of slots in the slot groups are divided into one group, a grouping result is as follows:

First group: {Cell 1, Cell 2, Cell 3}

Second group: {Cell 4}

Third group: {Cell 5}

If the scheduling cells with the same SCS and the same minimum spacing between the slot groups are divided into one group, a grouping result is as follows:

First group: {Cell 1, Cell 2}

Second group: {Cell 3}

Third group: {Cell 4}

Fourth group: {Cell 5}

If the scheduling cells with the same SCS, the same quantity of slots in the slot groups, and the same minimum spacing between the slot groups are divided into one group, a grouping result is as follows:

First group: {Cell 1, Cell 2}

Second group: {Cell 3}

Third group: {Cell 4}

Fourth group: {Cell 5}

Rule 3: Divide all scheduling cells that support slot group-based PDCCH blind detection limitation, have a same SCS, and have a same pattern in slot groups into one group.

Still using FIG. 3a to FIG. 3e as examples, Rule 3 is described in detail below.

It is to be noted that, first slot groups of Cell 1 and Cell 2 are both from a fourth slot to a seventh slot, and second slot groups are both from a 17th slot to a 20th slot Therefore, patterns of the slot groups of Cell 1 and Cell 2 are the same.

A result obtained by grouping scheduling cells based on Rule 3 is as follows:

First group: {Cell 1, Cell 2}

Second group: {Cell 3}

Third group: {Cell 4}

Fourth group: {Cell 5}

Rule 4: Divide all scheduling cells that support slot group-based PDCCH blind detection limitation and meet a first condition into one group.

The first condition may include any one of the following:

proportions of SCSs to sizes of slot groups are the same; or proportions of SCSs to sums of sizes of slot groups and minimum spacings between the slot groups are the same.

Still using FIG. 3a to FIG. 3e as examples, Rule 4 is described in detail below.

An SCS of each of Cell 1, Cell 2, and Cell 3 is 480 K, and a size of each slot group is 4 slots. Therefore, a proportion of the SCS of each of Cell 1, Cell 2, and Cell 3 to the size of each slot group is 480:4=120.

An SCS of Cell 4 is 960 K, and a size of a slot group is 8 slots. Therefore, a proportion of the SCS of Cell 4 to the size of the slot group is 960:8=120.

An SCS of Cell 5 is 480 K, and a size of a slot group is 8 slots. Therefore, a proportion of the SCS of Cell 5 to the size of the slot group is 480:8=60.

If the first condition is that proportions of SCSs to sizes of slot groups are the same, a result obtained by grouping scheduling cells based on Rule 4 is as follows:

First group: {Cell 1, Cell 2, Cell 3, Cell 4}

Second group: {Cell 5}

A minimum spacing between slot groups of Cell 1 and Cell 2 is 9 slots. A minimum spacing between slot groups of Cell 3 is 11 slots. A minimum spacing between slot groups of Cell 4 is 22 slots. A minimum spacing between slot groups of Cell 5 is 7 slots.

A proportion of an SCS of each of Cell 1 and Cell 2 to a sum of a size of each slot group and a minimum spacing between slot groups is 480:(4+9)=480/13.

A proportion of an SCS of Cell 3 to a sum of a size of a slot group and a minimum spacing between slot groups is 480:(4+11)=480/15=32.

A proportion of an SCS of Cell 4 to a sum of a size of a slot group and a minimum spacing between slot groups is 960:(8+22)=960/30=32.

A proportion of an SCS of Cell 5 to a sum of a size of a slot group and a minimum spacing between slot groups is 480:(8+7)=480/15=32.

If the first condition is that proportions of SCSs to sums of sizes of slot groups and minimum spacings between the slot groups are the same, a result obtained by grouping scheduling cells based on Rule 4 is as follows:

First group: {Cell 1, Cell 2}

Second group: {Cell 3, Cell 4, Cell 5}

Rule 5: Divide all scheduling cells that support slot group-based PDCCH blind detection limitation, meet a first condition, and have a same edge in slot groups into one group.

Still using FIG. 3a to FIG. 3e as examples, Rule 5 is described in detail below.

It is to be noted that, the edge of the slot group refers to a location along a length of an end slot of the slot group on an entire radio frame, radio subframe, or slot bundling (a unit having a plurality of consecutive slots, where a quantity of slots included in the slot bundling is greater than or equal to a quantity of slots included in the slot group).

Therefore, it can be learned from FIG. 3a to FIG. 3e that, edges in slot groups of cells Cell 1 and Cell 2 are the same, and edges in slot groups of cells Cell 3 and Cell 4 are the same.

With reference to the result obtained by grouping scheduling cells based on Rule 4, it can be learned that when the first condition is that proportions of SCSs to sizes of slot groups are the same, a result obtained by grouping scheduling cells based on Rule 5 is as follows:

First group: {Cell 1, Cell 2}

Second group: {Cell 3, Cell 4}

Second group: {Cell 5}

With reference to the result obtained by grouping scheduling cells based on Rule 4, it can be learned that when the first condition is that proportions of SCSs to sums of sizes of slot groups and minimum spacings between the slot groups are the same, a result obtained by grouping scheduling cells based on Rule 5 is as follows:

First group: {Cell 1, Cell 2}

Second group: {Cell 3, Cell 4}

Second group: {Cell 5}

Rule 6: Divide all scheduling cells that support slot-based PDCCH blind detection limitation and slot group-based PDCCH blind detection limitation, and meet a first condition into one group.

It is to be noted that, the scheduling cells that support slot-based PDCCH blind detection limitation may be scheduling cells that do not have a slot group on a radio frame or radio subframe or slot bundling.

Still using FIG. 3a to FIG. 3e as examples, Rule 6 is described in detail below.

If the first condition is that proportions of SCSs to sizes of slot groups are the same, based on an analysis result on a proportion of an SCS of each scheduling cell to a size of a slot group, a result obtained by grouping scheduling cells based on Rule 6 is as follows:

First group: {Cell 1, Cell 2, Cell 3, Cell 4}

Second group: {Cell 5}

If the first condition is that proportions of SCSs to sums of sizes of slot groups and minimum spacings between the slot groups are the same, based on an analysis result on a proportion of an SCS of each scheduling cell to a sum of a size of a slot group and a minimum spacing between slot groups, a result obtained by grouping scheduling cells based on Rule 6 is as follows:

First group: {Cell 1, Cell 2}

Second group: {Cell 3, Cell 4, Cell 5}

Rule 7: Divide all scheduling cells that support slot-based PDCCH blind detection limitation and slot group-based PDCCH blind detection limitation, meet a first condition, and have a same edge in slot groups into one group.

Still using FIG. 3a to FIG. 3e as examples, Rule 7 is described in detail below.

With reference to the result obtained by grouping scheduling cells based on Rule 5, it can be learned that when the first condition is that proportions of SCSs to sizes of slot groups are the same, a result obtained by grouping scheduling cells based on Rule 7 is as follows:

First group: {Cell 1, Cell 2}
Second group: {Cell 3, Cell 4}
Second group: {Cell 5}

With reference to the result obtained by grouping scheduling cells based on Rule 5, it can be learned that when the first condition is that proportions of SCSs to sums of sizes of slot groups and minimum spacings between the slot groups are the same, a result obtained by grouping scheduling cells based on Rule 7 is as follows:

First group: {Cell 1, Cell 2}
Second group: {Cell 3, Cell 4}
Second group: {Cell 5}

According to the PDCCH blind detection limiting method provided in the embodiments of this application, scheduling cells are grouped based on a plurality of rules, which can ensure that a plurality of scheduling cells can be reasonably grouped under various circumstances, to determine a blind detection limit on each group, and applicability is strong.

In an embodiment, the PDCCH blind detection limiting method provided in this embodiment of this application may further include:

grouping the plurality of scheduling cells in a case that a second condition is met, where the second condition includes one or more of the following:

Condition 1: A quantity of all scheduling cells that support the slot group-based PDCCH blind detection limitation is greater than a first threshold.

A value of the first threshold may be, for example, 6, 7, 9, or the like. A specific value may be adjusted according to actual conditions. This is not specifically limited in this embodiment of this application.

For example, when a PDCCH blind detection capability of the UE is strong, the value of the first threshold may be, for example, 10. For example, when the PDCCH blind detection capability of the UE is weak, the value of the first threshold may be, for example, 6.

Condition 2: A quantity of all scheduling cells that support the slot-based PDCCH blind detection limitation and the slot group-based PDCCH blind detection limitation is greater than a second threshold.

A value of the second threshold may be, for example, 8, 10, or the like. A specific value may be adjusted according to actual conditions. This is not specifically limited in this embodiment of this application.

For example, when a PDCCH blind detection capability of the UE is strong, the value of the second threshold may be, for example, 12. For example, when the PDCCH blind detection capability of the UE is weak, the value of the first threshold may be, for example, 8.

Condition 3: A quantity of all scheduling cells that support the slot group-based PDCCH blind detection limitation and have the same quantity of slots in the slot groups and/or have the same minimum spacing between the slot groups is greater than a third threshold.

A value of the third threshold may be, for example, 6, 8, or the like. A specific value may be adjusted according to actual conditions. This is not specifically limited in this embodiment of this application.

For example, when a PDCCH blind detection capability of the UE is strong, the value of the third threshold may be, for example, 10. For example, when the PDCCH blind detection capability of the UE is weak, the value of the third threshold may be, for example, 6.

According to the PDCCH blind detection limiting method provided in the embodiments of this application, a plurality of scheduling cells are grouped in a case that the second condition is met, which can ensure effective grouping, thereby ensuring a smooth progress of PDCCH blind detection.

In an embodiment, step S220 may include:

obtaining one or more of the following parameters, and determining, based on the obtained one or more parameters, the blind detection limitation information corresponding to the group. The parameters may include:

Parameter 1: a quantity A of cells in the group.

The quantity A of cells may be a quantity of cells in a current group.

Parameter 2: a cell quantity capacity value C.

The cell quantity capacity value C may be a maximum value of a quantity of scheduling cells that support slot group-based PDCCH blind detection limitation.

Parameter 3: a budget value B of each cell.

The budget value B of each cell may be a budget value of a blind detection resource of each cell.

The blind detection resource may include a PDCCH candidate and/or a CCE.

Parameter 4: a total quantity D1 of all scheduling cells that support the slot group-based PDCCH blind detection limitation.

Parameter 5: a quantity D2 of all scheduling cells that support the slot-based PDCCH blind detection limitation and the slot group-based PDCCH blind detection limitation.

Parameter 6: a quantity D3 of all scheduling cells that support the slot group-based PDCCH blind detection limitation and have the same quantity of slots in the slot groups and/or have the same minimum spacing between the slot groups.

In an embodiment, a total blind detection limit value of groups is a ceiling integer or a flooring integer of $(C*B*A/D)$, where $D=D1$, D2, or D3.

In an embodiment, PDCCH blind detection limitation for each group is applied to a time domain range of all slot groups in scheduling cells of the group.

In an embodiment, the PDCCH blind detection limitation may include limits on a quantity of PDCCH candidates and a quantity of control channel elements CCEs.

For example, all PDCCH blind detection resources owned by all scheduling cells in each group may be limited by the total blind detection limit value. For example, when the total blind detection limit value is 10, the quantity of PDCCH candidates owned by all the scheduling cells in the group is less than or equal to 10, and/or the quantity of CCEs owned by all the scheduling cells in the group is less than or equal to $10×16=160$, or $10×8=80$.

FIG. 9 is a schematic flowchart 2 of a PDCCH blind detection limiting method according to an embodiment of this application. As shown in FIG. 9, an embodiment of this application provides a PDCCH blind detection limiting method. The method is applied to a network side device and may include:

S910: Send a PDCCH based on PDCCH blind detection limitation.

The PDCCH blind detection limitation is determined in the following manner:

grouping a plurality of scheduling cells, and determining, based on a grouping result, PDCCH blind detection limitation information corresponding to each group, where the plurality of scheduling cells include at least one first cell that supports slot group-based physical downlink control channel PDCCH blind detection limitation.

It is to be noted that, the execution body of the method may be a network side device. The technical solutions of this application are described in detail below by using an example in which the network side device performs the method.

First, the UE may group the plurality of scheduling cells based on a grouping rule, and after determining a grouping result, the UE may determine, for each group, PDCCH blind detection limitation information corresponding to the group.

In scheduling cells to be grouped by the UE, a quantity of first cells may be 1, 3, 5, or the like. Alternatively, all scheduling cells may be first cells.

After determining PDCCH blind detection limitation, the UE may send the PDCCH blind detection limitation to the network side device. After receiving the PDCCH blind detection limitation, the network side device may send a PDCCH to the UE for the UE to perform PDCCH blind detection.

According to the PDCCH blind detection limiting method provided in the embodiments of this application, scheduling cells are grouped, and a blind detection corresponding to each group is determined based on a grouping result. Compared with the related art in which a PDCCH monitoring capability is mechanically defined based on a granularity per slot or per span, this application can effectively reduce complexity of implementing PDCCH monitoring by the UE, thereby significantly improving communication efficiency and reducing power consumption of the UE, which has a broad application prospect.

It is to be noted that, an execution body of the PDCCH blind detection limiting method provided in the embodiments of this application may be a PDCCH blind detection limiting apparatus or may be a control module in the PDCCH blind detection limiting apparatus for performing the PDCCH blind detection limiting method. The PDCCH blind detection limiting apparatus provided in this embodiment of this application is described by using an example in which the PDCCH blind detection limiting apparatus performs the PDCCH blind detection limiting method.

FIG. 10 is a schematic diagram 1 of a structure of a PDCCH blind detection limiting apparatus according to an embodiment of this application. As shown in FIG. 10, an embodiment of this application provides a PDCCH blind detection limiting apparatus. The apparatus is applied to a terminal and may include:

a grouping module 1010, configured to group a plurality of scheduling cells, where the plurality of scheduling cells include at least one first cell that supports slot group-based PDCCH blind detection limitation; and a determining module 1020, configured to determine, based on a grouping result, PDCCH blind detection limitation information corresponding to each group.

According to the PDCCH blind detection limiting apparatus provided in the embodiments of this application, scheduling cells are grouped, and a blind detection corresponding to each group is determined based on a grouping result. Compared with the related art in which a PDCCH monitoring capability is mechanically defined based on a granularity per slot or per span, this application can effectively reduce complexity of implementing PDCCH monitoring by the UE, thereby significantly improving communication efficiency and reducing power consumption of the UE, which has a broad application prospect.

Optionally, the PDCCH blind detection limiting apparatus provided in this embodiment of this application may further include a slot group determining module (not shown), configured to:

determine a quantity N of slots or a slot quantity set $\{Ni\}$ contained in the slot group to which the PDCCH blind detection limitation is applied; and determine, based on the determined quantity N of slots or slot quantity set $\{Ni\}$, a location of the slot group to which the PDCCH blind detection limitation is applied.

Optionally, the grouping module 1010 may be further configured to:

execute a rule for grouping the plurality of scheduling cells, including any one or more of the following:

dividing all scheduling cells that support slot group-based PDCCH blind detection limitation and have a same subcarrier spacing SCS into one group;

dividing all scheduling cells that support slot group-based PDCCH blind detection limitation, have a same SCS, and have a same quantity of slots in slot groups and/or have a same minimum spacing between the slot groups into one group;

dividing all scheduling cells that support slot group-based PDCCH blind detection limitation, have a same SCS, and have a same pattern in slot groups into one group;

dividing all scheduling cells that support slot group-based PDCCH blind detection limitation and meet a first condition into one group;

dividing all scheduling cells that support slot group-based PDCCH blind detection limitation, meet a first condition, and have a same edge in slot groups into one group;

dividing all scheduling cells that support slot-based PDCCH blind detection limitation and slot group-based PDCCH blind detection limitation, and meet a first condition into one group; or dividing all scheduling cells that support slot-based PDCCH blind detection limitation and slot group-based PDCCH blind detection limitation, meet a first condition, and have a same edge in slot groups into one group.

Optionally, the first condition may include any one of the following:

proportions of SCSs to sizes of slot groups are the same; or proportions of SCSs to sums of sizes of slot groups and minimum spacings between the slot groups are the same.

Optionally, the grouping module 1010 groups the plurality of scheduling cells in a case that a second condition is met. The second condition includes one or more of the following:

a quantity of all scheduling cells that support the slot group-based PDCCH blind detection limitation is greater than a first threshold;

a quantity of all scheduling cells that support the slot-based PDCCH blind detection limitation and the slot group-based PDCCH blind detection limitation is greater than a second threshold; or a quantity of all scheduling cells that support the slot group-based PDCCH blind detection limitation and have the same quantity of slots in the slot groups and/or have the same minimum spacing between the slot groups is greater than a third threshold.

Optionally, the determining module 1020 may be further configured to:

obtain one or more of the following parameters, and determining, based on the obtained one or more parameters, the blind detection limitation information corresponding to the group. The parameters may include:

a quantity A of cells in the group;

a cell quantity capacity value C;

a budget value B of each cell;

a total quantity D1 of all scheduling cells that support the slot group-based PDCCH blind detection limitation;

a quantity D2 of all scheduling cells that support the slot-based PDCCH blind detection limitation and the slot group-based PDCCH blind detection limitation; and a quantity D3 of all scheduling cells that support the slot group-based PDCCH blind detection limitation and have the same quantity of slots in the slot groups and/or have the same minimum spacing between the slot groups.

Optionally, a total blind detection limit value of groups is a ceiling integer or a flooring integer of (C*B*A/D), where D=D1, D2, or D3.

Optionally, PDCCH blind detection limitation for each group is applied to a time domain range of all slot groups in scheduling cells of the group.

Optionally, the PDCCH blind detection limitation may include limits on a quantity of PDCCH candidates and a quantity of CCEs.

Optionally, the quantity N of slots or the slot quantity set {Ni} may be obtained in one of the following manners:

obtaining through a network configuration;

obtaining through a quantity of a plurality of physical downlink shared channels PDSCHs or a quantity of slots that are schedulable by a downlink control information DCI time domain scheduling parameter;

obtaining through a capability parameter reported by the terminal UE, where the capability parameter includes the quantity N of slots or the slot quantity set {Ni}, or includes the quantity of a plurality of PDSCHs and the quantity of slots that are schedulable by the DCI time domain scheduling parameter; or obtaining through a quantity N of slots or a slot quantity set {Ni} predefined in a protocol.

Optionally, the location of the slot group may be determined in any one of the following manners:

determining through any N consecutive slots;

forming, on a radio frame or radio subframe or slot bundling slot bundling, a slot group every N slots from a first slot, where in a last group, a last slot of the radio frame or radio subframe or slot bundling is an end slot, and repeating, by a pattern of a slot group, on each radio frame or radio subframe or slot bundling;

using a slot configured by a network or reported by the UE as a start slot or a reference slot, and determining the location of the slot group based on the start slot or the reference slot and the quantity N of slots; and determining the pattern of the slot group based on a monitoring occasion configured by a search space SS.

Optionally, the determining the pattern of the slot group based on a monitoring occasion configured by a search space SS may include:

repeating, by the pattern of the slot group, on each radio frame or radio subframe or slot bundling, where a start point of a first slot group is a first slot having a monitoring occasion in the radio frame or radio subframe or slot bundling, and N slots from the start point of the first slot group form the first slot group, where a start point of a next slot group is a first slot that has a monitoring occasion and that is not in any previous slot group, and N slots from the start point of the next slot group form one slot group; and sequentially performing determination on a last slot group until an end point of the radio frame or radio subframe or slot bundling.

Optionally, the determining the pattern of the slot group based on a monitoring occasion configured by a search space SS may include:

varying, by the pattern of the slot group, on each radio frame or radio subframe or slot bundling, where for each radio frame or radio subframe or slot bundling, a start point of a first slot group is a first slot having a monitoring occasion in the radio frame or radio subframe or slot bundling, and N slots from the start point of the first slot group form the first slot group; and a start point of a next slot group is a first slot that has a monitoring occasion and that is not in any previous slot group, and N slots from the start point of the next slot group form one slot group; and sequentially performing determination on a last slot group until the radio frame or radio subframe or slot bundling ends.

Optionally, the determining the pattern of the slot group based on a monitoring occasion configured by a search space SS may include:

using a slot configured by a network or reported by the UE as a start slot or a reference slot, and determining the pattern of the slot group from the start slot, or determining the pattern of the slot group from a start point slot spaced apart from the reference slot by a preset quantity of slots, where a start point of a first slot group is a first slot having a monitoring occasion after the start slot or the start point slot, and N slots from the start point of the first slot group form the first slot group; and a start point of a next slot group is a first slot that has a monitoring occasion and that is not in any previous slot group, and N slots from the start point of the next slot group form one slot group; and sequentially determining the pattern of the slot group.

The PDCCH blind detection limiting apparatus in the embodiments of this application may be an apparatus, or may be a component, an integrated circuit, or a chip in the terminal. The apparatus may be a mobile terminal or may be a non-mobile terminal. Exemplarily, the mobile terminal may include but is not limited to a type of the terminal 11 listed above, and the non-mobile terminal may be a server, a network attached storage (Network Attached Storage, NAS), a personal computer (personal computer, PC), a television (television, TV), a teller machine, a self-service machine, or the like. This is not specifically limited in this embodiment of this application.

The PDCCH blind detection limiting apparatus in the embodiments of this application may be an apparatus having an operating system. The operating system may be an Android (Android) operating system, may be an ios operating system, or may be another possible operating system, and is not specifically limited in this embodiment of this application.

The PDCCH blind detection limiting apparatus provided in the embodiments of this application can implement the processes implemented in the method embodiment of FIG. 2 to FIG. 8 and achieve the same technical effect. To avoid repetition, details are not described herein again.

FIG. 11 is a schematic diagram 2 of a structure of a PDCCH blind detection limiting apparatus according to an embodiment of this application. As shown in FIG. 11, an embodiment of this application provides a PDCCH blind detection limiting apparatus. The apparatus is applied to a network side device and may include:

a channel sending module 1110, configured to send a PDCCH based on PDCCH blind detection limitation.

The PDCCH blind detection limitation is determined in the following manner:

grouping a plurality of scheduling cells, and determining, based on a grouping result, PDCCH blind detection limitation information corresponding to each group, where the plurality of scheduling cells include at least one first cell that supports slot group-based PDCCH blind detection limitation.

According to the PDCCH blind detection limiting apparatus provided in the embodiments of this application, scheduling cells are grouped, and a blind detection corresponding to each group is determined based on a grouping result. Compared with the related art in which a PDCCH monitoring capability is mechanically defined based on a granularity per slot or per span, this application can effectively reduce complexity of implementing PDCCH monitoring by the UE, thereby significantly improving communication efficiency and reducing power consumption of the UE, which has a broad application prospect.

The PDCCH blind detection limiting apparatus in the embodiments of this application may be an apparatus, or may be a component, an integrated circuit, or a chip in the terminal. The apparatus may be a mobile terminal or may be a non-mobile terminal. Exemplarily, the mobile terminal may include but is not limited to a type of the terminal 11 listed above, and the non-mobile terminal may be a server, a network attached storage (NAS), a personal computer (PC), a television (TV), a teller machine, a self-service machine, or the like. This is not specifically limited in this embodiment of this application.

The PDCCH blind detection limiting apparatus in the embodiments of this application may be an apparatus having an operating system. The operating system may be an Android operating system, may be an ios operating system, or may be another possible operating system, and is not specifically limited in this embodiment of this application.

The PDCCH blind detection limiting apparatus provided in the embodiments of this application can implement the processes implemented in the method embodiment of FIG. 3a to FIG. 8 and achieve the same technical effect. To avoid repetition, details are not described herein again.

Optionally, as shown in FIG. 12, an embodiment of this application further provides a communication device 1200, including a processor 1201, a memory 1202, and a program or instructions stored in the memory 1202 and runnable on the processor 1201. For example, in a case that the communication device 1200 is a terminal, the program or instructions is executed by the processor 1201 to implement the processes of embodiments of the PDCCH blind detection limiting method, and the same technical effects can be achieved. In a case that the communication device 1200 is a network side device, the program or instructions is executed by the processor 1201 to implement the processes of the PDCCH blind detection limiting method, and the same technical effects can be achieved. To avoid repetition, details are not described herein again.

FIG. 13 is a schematic diagram of a hardware structure of a terminal implementing an embodiment of this application.

The terminal 1300 includes, but is not limited to, components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art may understand that, the terminal 1300 may further include a power supply (such as a battery) for supplying power to the components. Preferably, the power supply may be logically connected to the processor 1310 by using a power management system, thereby implementing functions such as charging, discharging, and power consumption management by using the power management system. A terminal structure shown in FIG. 13 does not constitute a limitation to the terminal, and the terminal may include more or fewer components than those shown in the figure, or some components may be combined, or a different component deployment may be used. Details are not described herein again.

It may be understood that, in the embodiments of this application, the input unit 1304 may include a graphics processing unit (GPU) 13041 and a microphone 13042. The graphics processing unit 13041 processes image data of a static picture or a video obtained by an image capturing apparatus (for example, a camera) in a video capturing mode or an image capturing mode. The display unit 1306 may include a display panel 13061, for example, a display panel 13061 configured in a form such as a liquid crystal display or an organic light-emitting diode. The user input unit 1307 includes a touch panel 13071 and another input device 13072. The touch panel 13071 is also referred to as a touchscreen. The touch panel 13071 may include two parts: a touch detection apparatus and a touch controller. The another input device 13072 may include, but is not limited to, a physical keyboard, a functional key (such as a volume control key or a switch key), a track ball, a mouse, and a joystick, and the details will not be described herein again.

In this embodiment of this application, the radio frequency unit 1301 receives downlink data from a network side device and sends the data to the processor 1310 for processing; and sends uplink data to the network side device. Generally, the radio frequency unit 1301 includes, but is not limited to, an antenna, at least one amplifier, a transceiver, a coupler, a low noise amplifier, a duplexer, and the like.

The memory 1309 may be configured to store a software program or instructions and various data. The memory 1309 may mainly include a program storage or instruction area and a data storage area. The program storage or instruction area may store an operating system, an application program or instructions required by at least one function (for example, a sound playback function and an image playback function), or the like. In addition, the memory 1309 may include a high speed random access memory, and may further include a non-volatile memory. The non-volatile memory may be a read-only memory (ROM), a programmable ROM (PROM), an erasable PROM (EPROM), an electrically EPROM (EEPROM), or a flash memory. For example, at least one magnetic disk storage device, a flash memory device, or another non-volatile solid-state storage device.

Optionally, the processor 1310 may include one or more processing units. Optionally, the processor 1310 may integrate an application processor and a modem processor. The application processor mainly processes an operating system, a user interface, an application program or instructions, and the like. The modem processor mainly processes wireless communication, for example, a baseband processor. It may be understood that the foregoing modem processor may not be integrated into the processor 1310.

The processor 1310 is configured to: group a plurality of scheduling cells, where the plurality of scheduling cells include at least one first cell that supports slot group-based PDCCH blind detection limitation; and determine, based on a grouping result, PDCCH blind detection limitation information corresponding to each group.

According to the terminal provided in the embodiments of this application, scheduling cells are grouped, and a blind detection corresponding to each group is determined based on a grouping result. Compared with the related art in which a PDCCH monitoring capability is mechanically defined based on a granularity per slot or per span, this application can effectively reduce complexity of implementing PDCCH monitoring by the UE, thereby significantly improving communication efficiency and reducing power consumption of the UE, which has a broad application prospect.

Optionally, the processor 1310 may be configured to: determine, in the following manner, a slot group to which the PDCCH blind detection limitation is applied and that is in the first cell:

determining a quantity N of slots or a slot quantity set {Ni} contained in the slot group to which the PDCCH blind detection limitation is applied; and determining, based on the determined quantity N of slots or slot quantity set {Ni}, a location of the slot group to which the PDCCH blind detection limitation is applied.

Optionally, the processor 1310 is further configured to group a plurality of scheduling cells in a case that a second condition is met, where the second condition includes one or more of the following:

a quantity of all scheduling cells that support the slot group-based PDCCH blind detection limitation is greater than a first threshold;

a quantity of all scheduling cells that support the slot-based PDCCH blind detection limitation and the slot group-based PDCCH blind detection limitation is greater than a second threshold; or a quantity of all scheduling cells that support the slot group-based PDCCH blind detection limitation and have the same quantity of slots in the slot groups and/or have the same minimum spacing between the slot groups is greater than a third threshold.

Optionally, the processor 1310 is further configured to: obtain one or more of the following parameters, and determining, based on the obtained one or more parameters, the blind detection limitation information corresponding to the group, where the parameters include:

a quantity A of cells in the group;

a cell quantity capacity value C;

a budget value B of each cell;

a total quantity D1 of all scheduling cells that support the slot group-based PDCCH blind detection limitation;

a quantity D2 of all scheduling cells that support the slot-based PDCCH blind detection limitation and the slot group-based PDCCH blind detection limitation; and a quantity D3 of all scheduling cells that support the slot group-based PDCCH blind detection limitation and have the same quantity of slots in the slot groups and/or have the same minimum spacing between the slot groups.

Optionally, the processor 1310 is further configured to determine the pattern of the slot group based on a monitoring occasion configured by a search space SS, including:

repeating, by the pattern of the slot group, on each radio frame or radio subframe or slot bundling, where a start point of a first slot group is a first slot having a monitoring occasion in the radio frame or radio subframe or slot bundling, and N slots from the start point of the first slot group form the first slot group, where a start point of a next slot group is a first slot that has a monitoring occasion and that is not in any previous slot group, and N slots from the start point of the next slot group form one slot group; and sequentially performing determination on a last slot group until an end point of the radio frame or radio subframe or slot bundling.

Optionally, the processor 1310 is further configured to determine the pattern of the slot group based on a monitoring occasion configured by a search space SS, including:

varying, by the pattern of the slot group, on each radio frame or radio subframe or slot bundling, where for each radio frame or radio subframe or slot bundling, a start point of a first slot group is a first slot having a monitoring occasion in the radio frame or radio subframe or slot bundling, and N slots from the start point of the first slot group form the first slot group; and a start point of a next slot group is a first slot that has a monitoring occasion and that is not in any previous slot group, and N slots from the start point of the next slot group form one slot group; and sequentially performing determination on a last slot group until the radio frame or radio subframe or slot bundling ends.

Optionally, the processor 1310 is further configured to determine the pattern of the slot group based on a monitoring occasion configured by a search space SS, including:

using a slot configured by a network or reported by the UE as a start slot or a reference slot, and determining the pattern of the slot group from the start slot, or determining the pattern of the slot group from a start point slot spaced apart from the reference slot by a preset quantity of slots, where a start point of a first slot group is a first slot having a monitoring occasion after the start slot or the start point slot, and N slots from the start point of the first slot group form the first slot group; and a start point of a next slot group is a first slot that has a monitoring occasion and that is not in any previous slot group, and N slots from the start point of the next slot group form one slot group; and sequentially determining the pattern of the slot group.

The terminal provided in this embodiment of this application can effectively reduce complexity of implementing PDCCH blind detection by the UE, thereby significantly improving communication efficiency and reducing power consumption of the UE.

An embodiment of this application further provides a network side device. As shown in FIG. 14, the network device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and sends the received information to the baseband apparatus 1403 for processing. In a downlink direction, the baseband apparatus 1403 processes to-be-processed information, and sends the information to the radio frequency apparatus 1402. The radio frequency apparatus 1402 processes received information and sends the information by using the antenna 1401.

The frequency band processing apparatus may be located in the baseband apparatus 1403, and the method performed by the network side device in the foregoing embodiments may be implemented in the baseband apparatus 1403. The baseband apparatus 1403 includes a processor 1404 and a memory 1405.

The baseband apparatus 1403 may include, for example, at least one baseband plate. A plurality of chips are arranged on the baseband plate. As shown in FIG. 14, one of the plurality of chips is, for example, the processor 1404, and is connected to the memory 1405, to invoke a program in the memory 1405 to perform operations performed by the network side device in the foregoing method embodiment.

The baseband apparatus 1403 may further include a network interface 1406, configured to exchange information with the radio frequency apparatus 1402. The interface is, for example, a common public radio interface (common public radio interface, CPRI).

Alternatively, the network side device in this embodiment of this application further includes: instructions or a program stored in the memory 1405 and executable on the processor 1404, and the processor 1404 invokes the instructions or program in the memory 1405 to perform the method performed by the modules shown in FIG. 11, and can achieve the same technical effect. To avoid repetition, details are not described herein again.

An embodiment of this application further provides a readable storage medium. The readable storage medium may be non-volatile or volatile. The readable storage medium stores a program or instructions, the program or instructions, when executed by a processor, implementing the processes of the embodiments of the PDCCH blind detection limiting method, and achieving the same technical effect. To avoid repetition, details are not described herein again.

The processor is a processor in the terminal in the foregoing embodiments. The readable storage medium includes a computer-readable storage medium, for example, a read-only memory (ROM), a random access memory (RAM), a magnetic disk, an optical disk, or the like.

An embodiment of this application further provides a chip, including a processor and a communication interface coupled to each other, the processor being configured to run a program or instructions of a network side device to implement the processes of the embodiments of the PDCCH blind detection limiting method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product, where the computer program product is stored in a non-transitory readable storage medium, and the computer program product is configured to be executed by at least one processor to implement the processes of the embodiments of the PDCCH blind detection limiting method, and can achieve the same technical effects. To avoid repetition, details are not described herein again.

It is to be noted that, the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the related art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

What is claimed is:

1. A PDCCH blind detection limiting method performed by a terminal, comprising:
    grouping a plurality of scheduling cells into at least one cell group, wherein the plurality of scheduling cells comprise at least one first cell that supports slot group-based physical downlink control channel (PDCCH) blind detection limitation; and
    determining, based on a result of the grouping, PDCCH blind detection limitation information corresponding to each group of the at least one cell group;
    wherein a rule for grouping the plurality of scheduling cells into the at least one cell group comprises:
    grouping all scheduling cells that support the slot group-based PDCCH blind detection limitation, have a same subcarrier spacing (SCS), and have a same quantity of slots in slot groups into one cell group.

2. The PDCCH blind detection limiting method according to claim 1, further comprising: determining, in the following manner, a slot group to which the PDCCH blind detection limitation is applied and that is in the first cell:
    determining a quantity N of slots or a slot quantity set $\{Ni\}$ contained in the slot group to which the PDCCH blind detection limitation is applied; and
    determining, based on the determined quantity N of slots or slot quantity set $\{Ni\}$, a location of the slot group to which the PDCCH blind detection limitation is applied.

3. The PDCCH blind detection limiting method according to claim 1, wherein the determining, based on a result of the grouping, PDCCH blind detection limitation information corresponding to each group of the at least one cell group comprises:

obtaining one or more of the following parameters, and determining, based on the obtained one or more parameters, the blind detection limitation information corresponding to the cell group, wherein the parameters comprise:

a quantity A of cells in the cell group;

a cell quantity capacity value C;

a budget value B of each cell;

a total quantity D1 of all scheduling cells that support the slot group-based PDCCH blind detection limitation;

a quantity D2 of all scheduling cells that support the slot-based PDCCH blind detection limitation and the slot group-based PDCCH blind detection limitation; and a quantity D3 of all scheduling cells that support the slot group-based PDCCH blind detection limitation and have the same quantity of slots in the slot groups and/or have the same minimum spacing between the slot groups.

4. The PDCCH blind detection limiting method according to claim 3, wherein a total blind detection limit value of each group of the at least one cell group is a ceiling integer or a flooring integer of $(C*B*A/D)$, wherein D=D1, D2, or D3.

5. The PDCCH blind detection limiting method according to claim 1, wherein the PDCCH blind detection limitation comprises limits on a quantity of blind detection PDCCH candidates and a quantity of control channel elements CCEs.

6. The PDCCH blind detection limiting method according to claim 2, wherein the location of the slot group is determined in one of the following manners:

determining through any N consecutive slots;

forming, on a radio frame or radio subframe or slot bundling, a slot group every N slots from a first slot, wherein in a last group, a last slot of the radio frame or radio subframe or slot bundling is an end slot, and repeating, by a pattern of a slot group, on each radio frame or radio subframe or slot bundling;

using a slot configured by a network or reported by the UE as a start slot or a reference slot, and determining the location of the slot group based on the start slot or the reference slot and the quantity N of slots; and determining the pattern of the slot group based on a monitoring occasion configured by a search space SS.

7. The PDCCH blind detection limiting method according to claim 6, wherein the determining the pattern of the slot group based on a monitoring occasion configured by a search space SS comprises:

repeating, by the pattern of the slot group, on each radio frame or radio subframe or slot bundling, wherein a start point of a first slot group is a first slot having a monitoring occasion in the radio frame or radio subframe or slot bundling, and N slots from the start point of the first slot group form the first slot group, wherein a start point of a next slot group is a first slot that has a monitoring occasion and that is not in any previous slot group, and N slots from the start point of the next slot group form one slot group; and sequentially performing determination on a last slot group until an end point of the radio frame or radio subframe or slot bundling.

8. The PDCCH blind detection limiting method according to claim 6, wherein the determining the pattern of the slot group based on a monitoring occasion configured by a search space SS comprises:

varying, by the pattern of the slot group, on each radio frame or radio subframe or slot bundling, wherein for each radio frame or radio subframe or slot bundling, a start point of a first slot group is a first slot having a monitoring occasion in the radio frame or radio subframe or slot bundling, and N slots from the start point of the first slot group form the first slot group; and a start point of a next slot group is a first slot that has a monitoring occasion and that is not in any previous slot group, and N slots from the start point of the next slot group form one slot group; and sequentially performing determination on a last slot group until the radio frame or radio subframe or slot bundling ends.

9. The PDCCH blind detection limiting method according to claim 6, wherein the determining the pattern of the slot group based on a monitoring occasion configured by a search space SS comprises:

using a slot configured by a network or reported by the UE as a start slot or a reference slot, and determining the pattern of the slot group from the start slot, or determining the pattern of the slot group from a start point slot spaced apart from the reference slot by a preset quantity of slots, wherein a start point of a first slot group is a first slot having a monitoring occasion after the start slot or the start point slot, and N slots from the start point of the first slot group form the first slot group; and a start point of a next slot group is a first slot that has a monitoring occasion and that is not in any previous slot group, and N slots from the start point of the next slot group form one slot group; and sequentially determining the pattern of the slot group.

10. A PDCCH blind detection limiting method performed by a network side device, comprising:

sending a physical downlink control channel (PDCCH} based on PDCCH blind detection limitation, wherein the PDCCH blind detection limitation is determined in the following manner:

grouping a plurality of scheduling cells into at least one cell group based on a rule, and determining, based on a result of the grouping, PDCCH blind detection limitation information corresponding to each group of the at least one cell group, wherein the plurality of scheduling cells comprise at least one first cell that supports slot group-based PDCCH blind detection limitation, and the rule comprises:

grouping all scheduling cells that support the slot group-based PDCCH blind detection limitation, have a same subcarrier spacing (SCS), and have a same quantity of slots in slot groups into one cell group.

11. A terminal, comprising:

a processor; and a memory storing a program or instructions, wherein the program or instructions, when executed by the processor, causes the terminal to perform the following steps:

grouping a plurality of scheduling cells into at least one cell group, wherein the plurality of scheduling cells comprise at least one first cell that supports slot group-based physical downlink control channel (PDCCH) blind detection limitation; and determining, based on a result of the grouping, PDCCH blind detection limitation information corresponding to each group of the at least one cell group;

wherein a rule for grouping the plurality of scheduling cells into the at least one cell group comprises:

grouping all scheduling cells that support the slot group-based PDCCH blind detection limitation, have a same subcarrier spacing (SCS), and have a same quantity of slots in slot groups into one cell group.

12. The terminal according to claim 11, wherein the program or instructions, when executed by the processor, causes the terminal to further perform the following steps:

determining, in the following manner, a slot group to which the PDCCH blind detection limitation is applied and that is in the first cell:

determining a quantity N of slots or a slot quantity set {Ni} contained in the slot group to which the PDCCH blind detection limitation is applied; and determining, based on the determined quantity N of slots or slot quantity set {Ni}, a location of the slot group to which the PDCCH blind detection limitation is applied.

13. The terminal according to claim 11, wherein the program or instructions, when executed by the processor, causes the terminal to further perform the following steps:

obtaining one or more of the following parameters, and determining, based on the obtained one or more parameters, the blind detection limitation information corresponding to the cell group, wherein the parameters comprise:

a quantity A of cells in the cell group;

a cell quantity capacity value C;

a budget value B of each cell;

a total quantity D1 of all scheduling cells that support the slot group-based PDCCH blind detection limitation;

a quantity D2 of all scheduling cells that support the slot-based PDCCH blind detection limitation and the slot group-based PDCCH blind detection limitation; and a quantity D3 of all scheduling cells that support the slot group-based PDCCH blind detection limitation and have the same quantity of slots in the slot groups and/or have the same minimum spacing between the slot groups.

14. The terminal according to claim 13, wherein a total blind detection limit value of each group of the at least one cell group is a ceiling integer or a flooring integer of (C*B*A/D), wherein D=D1, D2, or D3.

15. The terminal according to claim 11, wherein the PDCCH blind detection limitation comprises limits on a quantity of blind detection PDCCH candidates PDCCH candidates and a quantity of control channel elements CCEs.

16. The terminal according to claim 12, wherein the location of the slot group is determined in one of the following manners:

determining through any N consecutive slots;

forming, on a radio frame or radio subframe or slot bundling, a slot group every N slots from a first slot, wherein in a last group, a last slot of the radio frame or radio subframe or slot bundling is an end slot, and repeating, by a pattern of a slot group, on each radio frame or radio subframe or slot bundling;

using a slot configured by a network or reported by the UE as a start slot or a reference slot, and determining the location of the slot group based on the start slot or the reference slot and the quantity N of slots; and determining the pattern of the slot group based on a monitoring occasion configured by a search space SS.

17. A network side device, comprising:

a processor; and a memory storing a program or instructions, wherein the program or instructions, when executed by the processor, causes the network side device to perform the PDCCH blind detection limiting method according to claim 10.

18. A non-transient computer readable storage medium, storing a program or instructions, wherein the program or instructions, when executed by a processor, performs the PDCCH blind detection limiting method according to claim 1.

19. A non-transient computer readable storage medium, storing a program or instructions, wherein the program or instructions, when executed by a processor, performs the PDCCH blind detection limiting method according to claim 10.

* * * * *